(12) United States Patent
Sennett et al.

(10) Patent No.: US 8,320,873 B2
(45) Date of Patent: Nov. 27, 2012

(54) SYSTEM AND METHOD FOR THE DEFINITION AND SCOPE OF COMMERCIAL MOBILE ALERTS

(75) Inventors: DeWayne A. Sennett, Redmond, WA (US); Brian K. Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 270 days.

(21) Appl. No.: 12/648,828

(22) Filed: Dec. 29, 2009

(65) Prior Publication Data
US 2011/0159837 A1 Jun. 30, 2011

(51) Int. Cl.
*H04M 11/04* (2006.01)
(52) U.S. Cl. .................. 455/404.1; 455/404.2
(58) Field of Classification Search ..... 455/404.1–404.2
See application file for complete search history.

(56) References Cited

U.S. PATENT DOCUMENTS

| | | | | |
|---|---|---|---|---|
| 2003/0196200 A1* | 10/2003 | Manson et al. | ................. | 725/33 |
| 2004/0103158 A1* | 5/2004 | Vella et al. | .................... | 709/206 |
| 2007/0210910 A1* | 9/2007 | Norstrom et al. | ............ | 340/506 |
| 2009/0170467 A1* | 7/2009 | Nowlan et al. | ............. | 455/404.1 |

* cited by examiner

*Primary Examiner* — Olumide T Ajibade Akonai
*Assistant Examiner* — Jaime Holliday
(74) *Attorney, Agent, or Firm* — Woodcock Washburn LLP

(57) ABSTRACT

An emergency alert gateway configured for receiving an emergency alert message wherein the alert message includes a text message and one of an audio message, a video message, an audio-video message and a multi-media message; storing an audio, video or multimedia portion of the alert message to form a first stored portion and for determining a subscriber base to receive the alert message. There is a database in communication with the alert gateway and an emergency alert server configured to broadcast the alert message to the subscriber base, and if the first stored portion of the alert message is not available, then broadcasting only the text message as the alert message.

19 Claims, 9 Drawing Sheets

SYSTEM AND METHOD FOR THE DEFINITION AND SCOPE OF COMMERCIAL MOBILE ALERTS

TECHNICAL FIELD

The technical field generally relates to wireless communications and more specifically relates to emergency alerts delivered through wireless networks.

BACKGROUND

In response to the Warning, Alert, and Response Network (WARN) Act passed by Congress in 2006, the FCC has established the Commercial Mobile Alert System (CMAS) to allow wireless service providers choosing to participate to send emergency alerts as text messages to their subscribers. During 2007 and 2008 the FCC proposed and then adopted the network structure, technical requirements, and operating procedures for the CMAS. The CMAS network will allow the Federal Emergency Management Agency (FEMA), to accept and aggregate alerts from the President of the United States, the National Weather Service (NWS), and state and local emergency operations centers, and then send the alerts over a secure interface to participating wireless providers. These participating wireless providers will then distribute the alerts to their customers.

SUMMARY OF THE INVENTION

The present invention is directed to a system and method for sending emergency alert messages. The message includes determining the type of message from one of a text message, an audio message, a video message, an audio-video message and a multimedia message, wherein audio, video and multimedia portions of the message are stored at a gateway. The alert message is validated to determine the availability of the stored portion of the alert message. Then the method continues with broadcasting the alert message to a subscriber base, and if the stored portion is unavailable, then broadcasting only the text message associated with the alert message.

The method may further include retrieving the stored portion of the alert message after the validating step and wherein the broadcasting step includes the broadcasting of the stored portion of the message. Further, the method may include geo-targeting the subscriber base that will receive the broadcast alert message. If the target area is to be modified, then the method includes modifying the geo-targeting area and broadcasting the alert message to both the previous subscriber base identified by the geo-targeting step and an updated subscriber base based on the modified geo-targeted area. The broadcasting step may include determining a receive capability of a mobile device and broadcasting the alert message as a function of the receive capability of the mobile device. If the alert message is to be modified, then the method includes modifying the alert message and broadcasting the modified alert message, wherein the modified alert message includes previously broadcast audio, video or multimedia files.

The present invention is also directed to a system for distributing emergency alerts including an emergency alert gateway configured for (i) receiving an emergency alert message wherein the alert message includes a text message and one of an audio message, a video message, an audio-video message and a multi-media message; (ii) storing an audio, video or multimedia portion of alert message to form a first stored portion, (iii) for determining a subscriber base to receive the alert message, a database in communication with the alert gateway; and an emergency alert server configured to broadcast the alert message to the subscriber base, and if the first stored portion of the alert message is not available, then broadcasting only the text message as the alert message. In one embodiment of the invention, the alert message is broadcast to a first geo-targeted area and if the geo-targeted area is updated to a second geo-targeted area, then a revised alert message is sent to the first geo-targeted area and to the second geo-targeted area. The stored portion of the alert message may be updated and the invention includes the alert server then broadcasting both the updated stored portion of the alert message and the first stored portion of the alert message.

BRIEF DESCRIPTION OF THE DRAWINGS

The following description is better understood when read in conjunction with the appended drawings.

DESCRIPTION OF ILLUSTRATIVE EMBODIMENTS

The system and method of the present invention are directed to a system and method for issuing mobile alerts, including text messaging alerts, streaming audio and/or streaming video alerts, and MMS alerts. Moreover, the system and method of the present invention also includes updating those alerts and canceling those alerts.

Scenario for CMAS Alert

CMAS alerts are intended to be issued when an event has occurred and the appropriate government entities have decided to issue a CMAS alert to warn the commercial mobile subscribers of the event within the indicated alerting area. The government entities may decide to issue a text based alert only, or a text based alert that is accompanied by audio and/or video, each of which may be pre-recorded and which is preferably streamed to mobile subscribers by the wireless service providers. In accordance with another embodiment, the text based alert may be accompanied by a multimedia component that is downloaded and subsequently presented to the mobile subscriber. Examples of multimedia components may include, but are not limited to, maps, graphs, charts photographs, downloaded audio clips and downloaded video clips.

Figure 1:
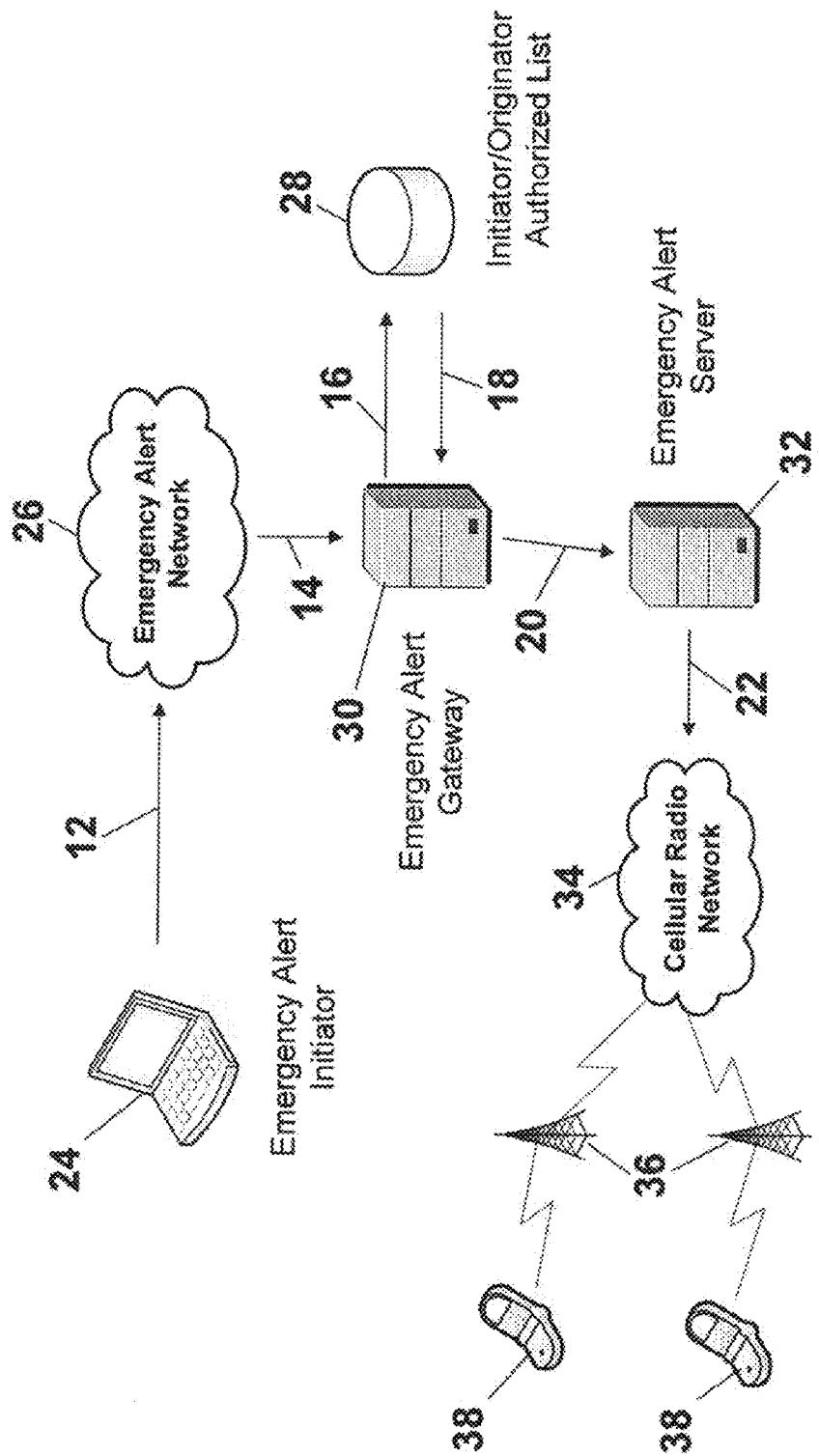
FIG. 1 is a flow diagram of an example process and system for generating and distributing a predetermined emergency alert message.

With reference to FIG. 1, there is shown a flow diagram of an example process and system for generating and distributing a predetermined emergency alert message. At step 12, an emergency alert message is provided to the emergency alert network 26 by an emergency alert initiator 24. In an example embodiment, the emergency alert network 26 is a network configured to accommodate Emergency Alert System (EAS) messages. The emergency alert initiator 24 can be any appropriate emergency alert initiator. For example, an emergency alert initiator 24 can be a government official, a member of a police department, an organization such as the National Weather Service, or the like. Thus the emergency alert initiator 24 could be any of thousands of emergency alert initiators located throughout the United States and Canada.

When the emergency alert initiator 24 receives notification of an existing or pending emergency, the emergency alert initiator 24 generates an emergency alert message formatted in conformance with a protocol for transmission to the emergency alert network 26. The transmission of the emergency alert message, at step 12, can be via a wired interface, a wireless interface, or a combination thereof. The protocol can comprise any appropriate protocol. In an example embodiment, the emergency alert message provided at step 12 is formatted in accordance with the common alerting protocol (CAP). The common alerting protocol is a general format for exchanging all-hazard emergency alerts and public warnings over various wireless networks. A CAP alert message (an alert message formatted in accordance with the common alerting protocol), comprises segments, or fields, indicative of various characteristics of emergency event. For example, the CAP comprises fields indicative of the sender of the emergency alert message, the type of event, the expiration of the event, the urgency of the event, the severity of the event, the certainty of the event, and the intended audience of the event.

At step 14, the emergency alert message is provided to a wireless emergency alert gateway 30. The transmission of the emergency alert message, at step 14, can be via a wired interface, a wireless interface, or a combination thereof. The emergency alert gateway 30 can comprise any appropriate processor, server, or the like. Upon receipt of the emergency alert message (at step 14), the emergency alert gateway 30 analyzes the received emergency alert message to generate, or select, a predetermined emergency alert message and to determine if the initiator/originator of the emergency alert message is an authorized emergency alert initiator/originator.

Pre-Conditions for Receiving CMAS Alerts

In order to receive CMAS alerts of any type, certain preconditions are preferably in place. It is not necessary for each of these preconditions to be met in all circumstances and they may be adjusted from time to time in order to enable the reception of CMAS alerts. For example, to receive CMAS alerts, it is preferable that the mobile device is authorized and authenticated for service on commercial mobile operator network and is capable of receiving adequate radio signal strength from the commercial mobile operator. The mobile device is preferably in a state that allows for the detection and reception of CMAS alert (e.g., not busy, not on a voice call). Additionally, it is preferable that there are no previous CMAS alerts being broadcast by the commercial mobile operator, there is no active CMAS alert on mobile device. Finally the mobile subscriber should preferably be within the alerting area for the CMAS alert. There may be additional preconditions for audio-video mobile alerts or multi-media alerts, specifically that the mobile device is capable of receiving such alerts.

Figure 2:
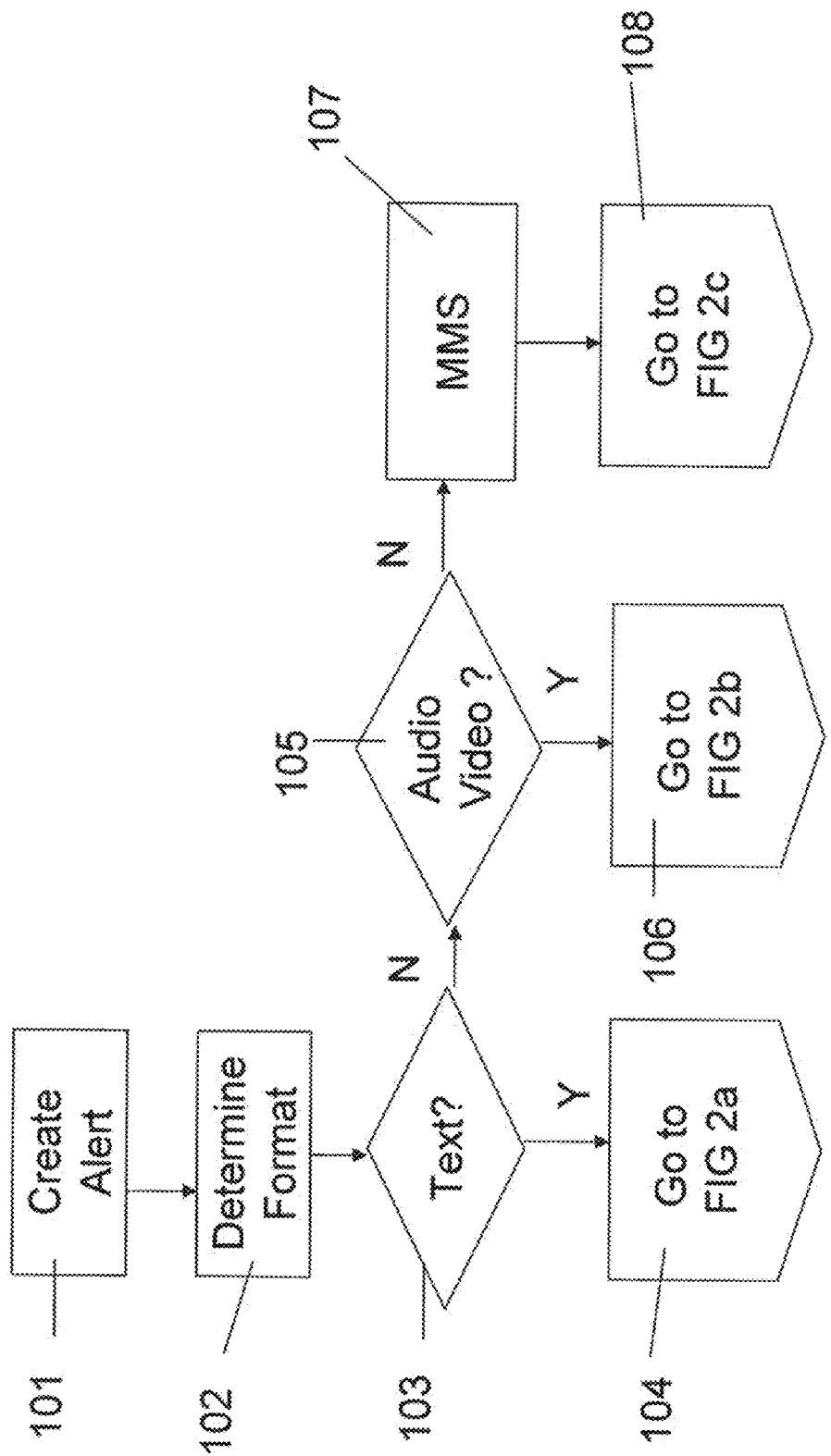
FIG. 2, including FIG. 2A through FIG. 2C is a flow diagram of an example process illustrating the steps to create and deliver particular types of alerts.

With reference to FIG. 2, the normal flow for the text based, audio-video, or multimedia CMAS alerts will be as described in the following steps and in the associated flow diagram which follows. At step 101, the appropriate government entity creates the alert message in CAP format which is sent to the government alerting network. At step 102, the government alerting network determines the type of alert that will be sent. At step 103, the check is made whether the alerting network will be sending a text alert. If not, then the check is made to determine if the alert will be a audio video alert at step 105. If not, then it will be assumed that the alert will be a multimedia message (MMS) alert at 107. If a text alert is to be sent, then step 104 illustrates that the process will continue with the flow represented in FIG. 2*a*. If an audio-video alert is to be sent, then step 106 illustrates that the process flow will continue with step 106 as illustrated in FIG. 2*b*. If a MMS alert is to be sent, then step 108 illustrates that the process flow will continue with step 108 as illustrated in FIG. 2*c*.

Normal Flow for Text Alerts

Figure 2A:
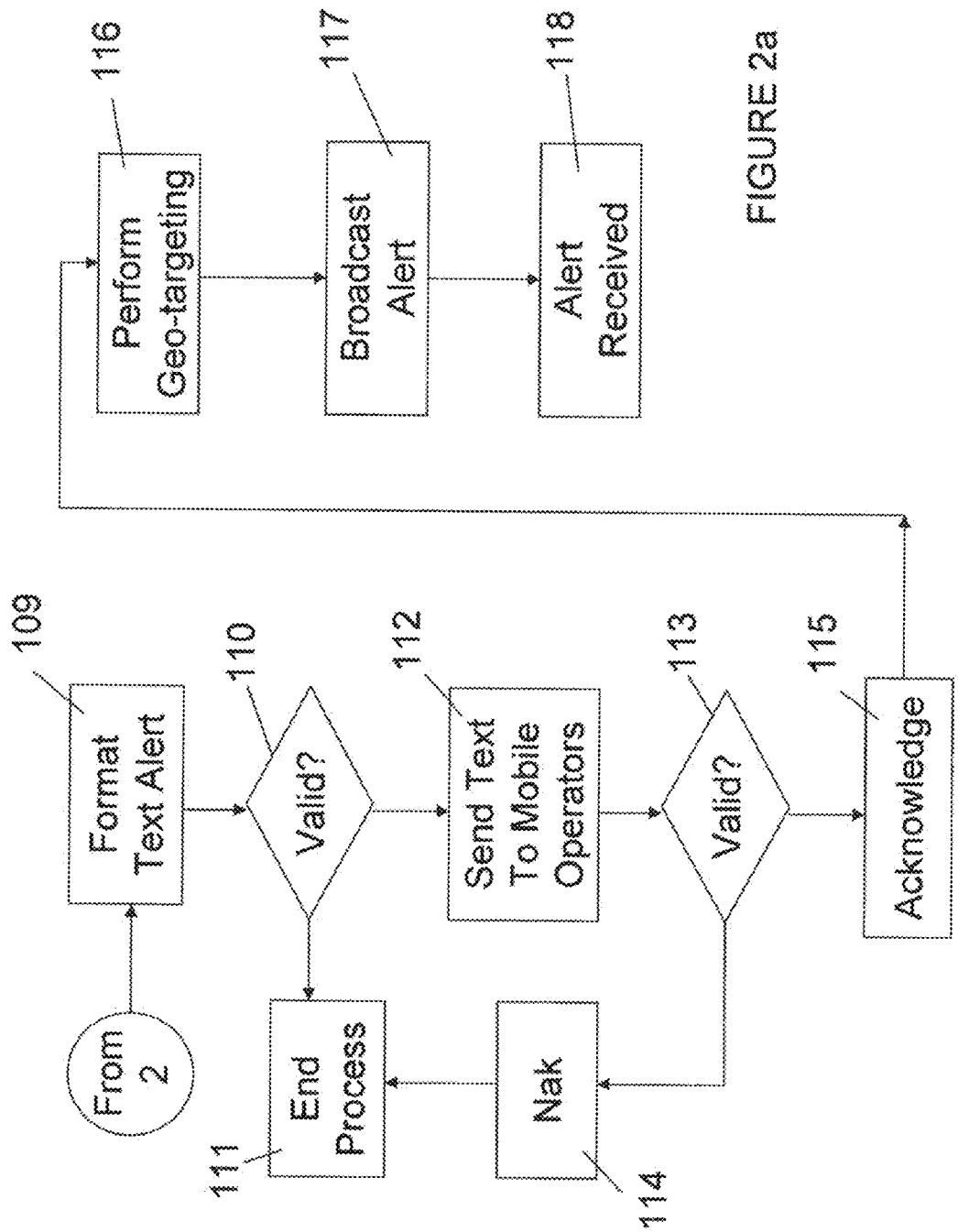
Figure 2B:
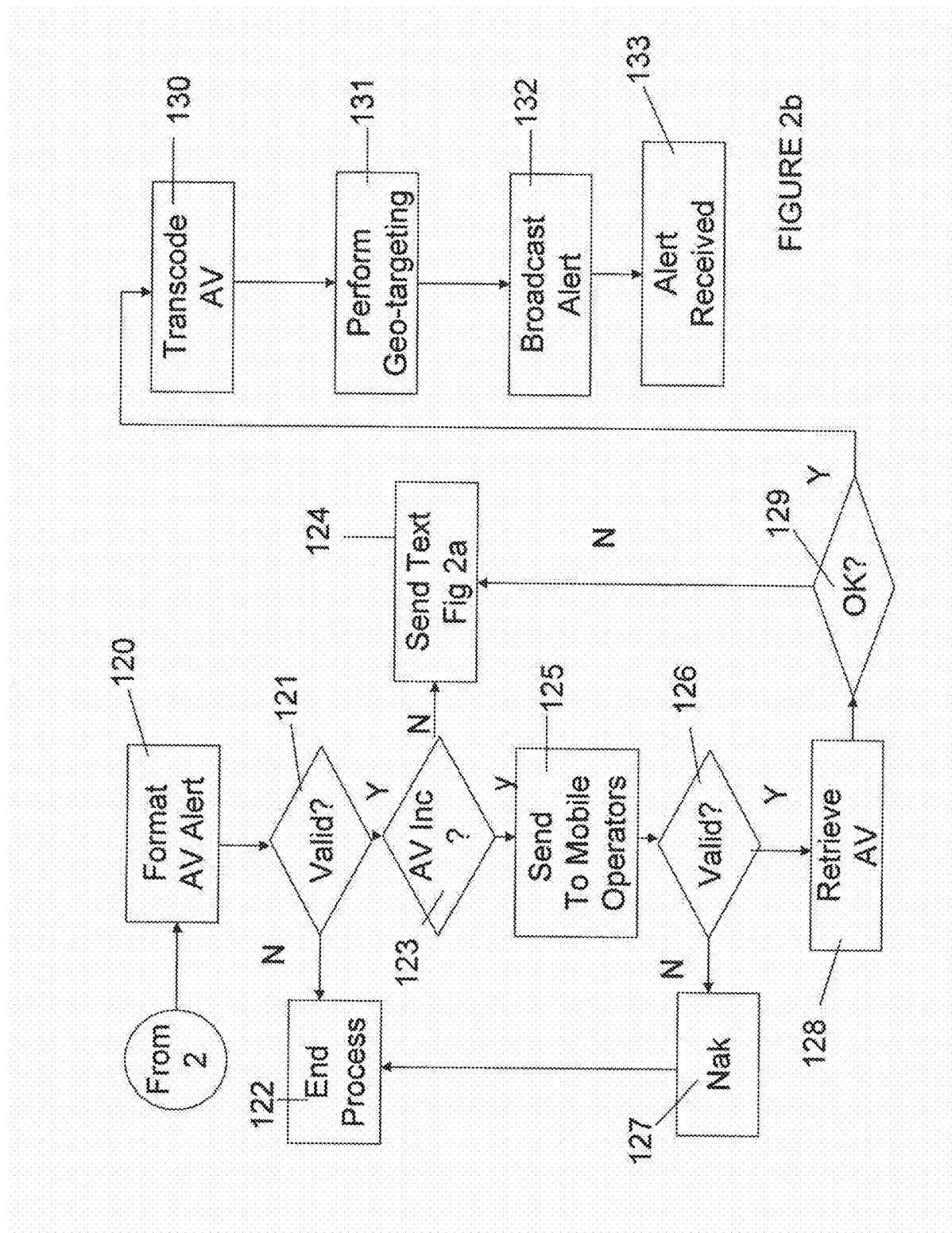
Figure 2C:
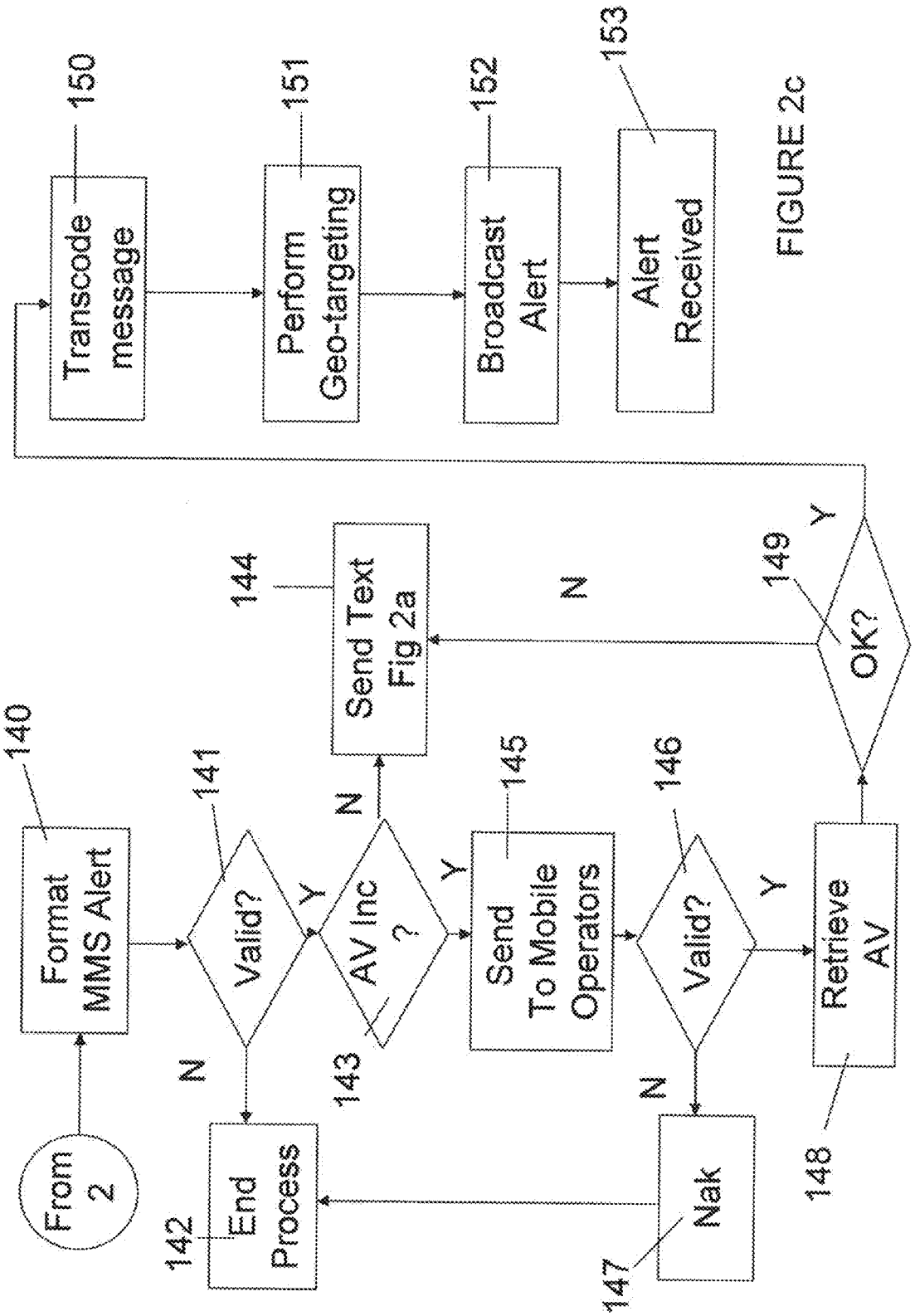

Assuming that a text alert is to be sent and with reference to FIG. 2*a*, the government alerting network converts the received alert message into the text based CMAS format supported by the commercial mobile operators at step 109 and validates and authenticates the received alert request at step 110. Note that if the alert fails validation, authentication, or conversion, the alert is not sent to the commercial mobile operator and no further processing will be performed at step 111. At step 112, the text based CMAS message is sent to the commercial mobile operator. At step 113, the commercial mobile operator validates the received CMAS alert message. At this point, if the CMAS alert message fails validation, an error response is returned to the government alerting network at step 114 and the CMAS alert is not broadcast by the commercial mobile operator and no further processing will be performed at step 111. At step 115, the commercial mobile operator sends an acknowledgement to the government alerting network that a valid CMAS alert message has been received. At step 116, the commercial mobile operator performs geo-targeting to translate the indicated alert area into the associated set of cell sites/pager transceivers for the broadcast of the CMAS alert. Note that if the commercial mobile operator does not support CMAS in the indicated alert area or if the commercial mobile operator does not have any cell site/pager transceiver coverage within the indicated alert area, the CMAS alert is not broadcast by the commercial mobile operator and no further processing is performed. Also, if the entire nation is indicated as the alert area then all cell sites/pager transceivers of the commercial mobile operator which support the CMAS service will preferably be used for the broadcast of the CMAS alert. At step 117, the commercial mobile operator broadcasts the CMAS alert message to the set of cell sites/pager transceivers identified by the geo-targeting processing in the previous step 116. In normal operations, the mobile device(s) monitors for the broadcast of the CMAS alert message via the commercial mobile operator selected technology. Note that in this scenario, if the CMAS alert is not a Presidential alert and if the end user opt-out selections for CMAS alerts indicate that this type of CMAS alert is not to be presented, the CMAS alert is discarded or ignored. Finally, at step 118, the CMAS alert is received and presented to the end user including the activation of the special emergency alert tone and/or the activation of the special emergency alert vibration cadence (if mobile device has vibration capabilities) for a short duration as defined by commercial mobile operator policies and the capabilities of the mobile device, and the display of the CMAS alert message text on the visual display of the mobile device. It is preferable that activation of the special emergency tone and/or special vibration cadence will comply with the end user mobile device configuration as defined in the section on CMAS Client on Mobile Device.

Normal Flow for Audio or Video Based Alerts

Assuming that the text is an audio or video alert at step 105, the processing continues with the flow represented in FIG. 2*b*.

The normal flow for the audio or video based CMAS alerts will be as described in the following steps. The appropriate government entity creates the alert message in CAP format which is sent to the government alerting network at step 120. The alert message preferably contains both the text information and either the associated recorded audio or recorded video components or the location of the associated recorded audio or recorded video information (e.g., an URL). The government alerting network validates and authenticates the received alert request at step 121. If the validation fails, the process ends at step 122 and no further processing is performed. At step 123, a check is made to determine if the associated recorded audio or video files were included in the CAP message. If the associated recorded audio files or recorded video components were not included in the CAP message but are available, the government alerting network retrieves the associated recorded audio or recorded video components from alert source and stores them at the Alerting Gateway in the government alerting network. If the retrieval of the recorded audio or video components fail or if the recorded audio or video components are not in valid formats at step 123, the text component of the CMAS alert will be sent as a text based alert at step 124, which may follow the process flow of FIG. 2a. If however, the audio and video components are available, accessible, included or stored at step 123, then the government alerting network converts the received alert message into the CMAS format supported by the commercial mobile operators. The CMAS message will contain the text component of the alert message and indications of the audio or video components. The CMAS alert message with the text component and indications of the locations of the audio or video components are sent to the commercial mobile operator at step 125. After successful validation at step 126 and using the indications of the locations of the audio or video components, the commercial mobile operator retrieves the audio or video components from the Alerting Gateway in the government alerting network at step 128. If the retrieval from the Alerting Gateway of the audio or video components fails at step 129, an error response is returned to the government alerting network and the text component of the CMAS alert will be sent as described in FIG. 2 (step 124). If the retrieval from the Alerting Gateway of the audio or video components is successful at step 129, then the commercial mobile operator performs a transcoding of the recorded audio or recorded video components into formats compatible with the mobile devices (i.e., streaming or downloading) and the commercial mobile operator selected technologies at step 130. If the transcoding of the recorded audio or recorded video components fail for any reason at step 130, an error response is returned to the government alerting network and the text component of the CMAS alert will be sent as described in FIG. 2a.

The commercial mobile operator validates the received CMAS alert message (not shown) after the transcoding step. If the CMAS alert message fails validation, an error response is returned to the government alerting network at step 127 and the CMAS alert is not broadcast by the commercial mobile operator and no further processing is performed and the process ends at step 122. If the CMAS alert message passes validation, the commercial mobile operator sends an acknowledgement to the government (not shown) alerting network that a valid CMAS alert message with all components has been received. The commercial mobile operator performs geo-targeting at step 131 to translate the indicated alert area indicated the associated set of cell sites/pager transceivers for the broadcast of the CMAS alert. If the commercial mobile operator does not support CMAS in the indicated alert area, the CMAS alert is not broadcast by the commercial mobile operator. If the commercial mobile operator does not have any cell site/pager transceiver coverage within the indicated alert area, the CMAS alert is not broadcast by the commercial mobile operator. If the CMAS alert is a Presidential alert, the alert area could be a specific area which is mapped to an associated set of cell sites/pager transceivers or the alert area could be the entire nation. If the entire nation is indicated as the alert area then all cell sites/pager transceivers of the commercial mobile operator which support the CMAS service will be used for the broadcast of the CMAS alert.

It should be understood that since different technologies may be used to broadcast the text, audio, and video components of the CMAS alert message, there may be a different set of associated cell sites/pager transceivers for the text, audio, and video components of the CMAS alert message. At step 132 the commercial mobile operator broadcasts the text component of the CMAS alert message with indications of the associated audio or video components to the set of cell sites/pager transceivers for the text component of the CMAS alert which were identified by the geo-targeting processing step. The text component of the CMAS alert message will be broadcast via the commercial mobile operator selected technologies. The broadcast of the text, audio, and video components of the CMAS alert message may not be on the same commercial mobile operator selected technologies. If the text, audio, and video components of the CMAS alert message are being broadcast with the same technology, all components may not be broadcast on the same channels/frequencies. If the text, audio, and video components of the CMAS alert message are not being broadcast with the same technology, the coverage areas of all broadcasts may not be identical.

The commercial mobile operator begins a streaming broadcast of the recorded audio or recorded video components of the CMAS alert message to the set of cell sites/pager transceivers for the audio or video components of the CMAS alert which were identified by the geo-targeting processing step. The audio or video components of the CMAS alert message will be transmitting via a streaming broadcast using the commercial mobile operator selected technologies to be received by the end user at step 133. The end user may request the audio or video components of the CMAS alert at any time after the presentation of the text component on the mobile device. Additionally, the audio or video components of the CMAS alert may be broadcast independently of the text component of the CMAS alert. Therefore, the streaming broadcast of the audio or video components needs to be transmitted as a continuous loop until the CMAS alert is cancelled or expires. The mobile device detects the broadcast of the text component of the CMAS alert message via the commercial mobile operator selected technology and receives the text component of the CMAS alert message. In conjunction with the text component of the CMAS alert message, there will be indications of the audio or video components that are also being transmitted via a streaming broadcast. If the received CMAS alert is not a Presidential alert and if the end user opt-out selections for CMAS alerts indicate that this type of CMAS alert is not to be presented, the received CMAS is discarded.

The text component of the CMAS alert and indications of the additional audio or video information is presented to the end user including the activation of the special emergency alert audible alarm, the activation of the special emergency alert vibration cadence (if mobile device has vibration capabilities), and the display of the CMAS alert message text on the visual display of the mobile device. If the end user has muted the mobile device audio and alarms, the special emergency alert audible alarm will not be activated. If the end user has deselected the vibration capabilities of the mobile device, the special emergency alert vibration cadence will not be activated. The end user acknowledges the CMAS alert by appropriate input on the mobile device user interface (e.g., keypad, touch screen). If the end user does not acknowledge the CMAS alert, the mobile device will periodically activate and deactivate the special emergency alert audible alarm, if the mobile device audio is not muted, and will periodically activate and deactivate the special emergency alert vibration cadence, if mobile device has vibration capabilities and if the vibration cadence is not deselected by the end user. Upon acknowledgement by the end user, the mobile device discontinues the special emergency alert audible alarm and the special vibration cadence.

The end user requests the additional audio or video alert information by appropriate input on the mobile device user interface. It is possible that appropriate mobile device user interface input could be defined such that a single input from the end user could be used to both acknowledge the CMAS alarm and to request the additional audio or video alert information. This single input from the end user should comply with the end user selections on muting of the mobile device audio capabilities and should not automatically un-mute the mobile device.

The mobile device detects and starts receiving the streaming broadcast of the audio or video components of the CMAS alert. If the mobile device is unable to detect or receive the streaming broadcast of audio or video components of the CMAS alert, an indication will be presented to the end user that the audio or video information is not currently available. The end user could have the ability to retry the request for the additional audio or video alert information via an appropriate input on the mobile device user interface. If the streaming broadcast of the audio or video alert information is detected by the mobile device, the streaming broadcast of the audio or video components of the CMAS alert is presented to the end user. If the end user has muted the audio on their mobile device, the end user will need to un-mute their device. There is no automatic un-mute of the mobile device audio upon receiving the streaming broadcast of the audio or video components of the CMAS alert. The end user may start receiving the streaming broadcast of the audio or video components at any point within the broadcast. Therefore, the streaming broadcast of the audio and video components must be performed on a continuous loop as that the end user will receive any portions that they may have missed. Note that if the CMAS alert contains multiple recorded audio or recorded video components, the relevant steps may be repeated for each recorded audio or recorded video component.

The mobile device prompts the end user whether or not to store the text component of the CMAS alert message. This prompt to the end user could be presented with the audio or video components or could be presented as the result of the end user discontinuing the reception of the streaming broadcast of the audio or video components of the CMAS alert. The end user responds to the query of the mobile device via an appropriate input on the mobile device user interface. In accordance with the end user response in the previous step, the mobile device either discards the text component of the CMAS alert message or stores the text component of the CMAS alert message in mobile device memory. If the mobile device memory storage for CMAS alerts is full, the mobile device will discard the oldest entry in the mobile device memory in order to have memory space for the text component of this newest CMAS alert message.

Normal Flow for MMS Alerts

If it was determined in the process flow at step 107 that the CMAS alert was a multimedia alert at step 107, an exemplary normal flow for the multimedia CMAS alerts will be as described in FIG. 2c as shown in step 108. The appropriate government entity creates the alert message in CAP format which is sent to the government alerting network at step 140. The alert message contains both the text information and either the associated multimedia components or the location of the associated multimedia information (e.g., an URL). The government alerting network validates and authenticates the received alert request at step 141. A check is made to see if the associated multimedia components were included in the CAP message at step 143. If yes, the government alerting network retrieves the associated multimedia components from the alert source and stores them at the Alerting Gateway in the government alerting network. If the retrieval of the multimedia components fails or if the multimedia components are not in valid formats, the process proceeds to step 144 and the text component of the CMAS alert will be sent as described in FIG. 2a.

If the retrieval is successful, the government alerting network converts the received alert message into the CMAS format supported by the commercial mobile operators. The CMAS message will contain the text component of the alert message and indications of the locations of the multimedia components. If the alert fails validation, authentication, or conversion, the alert is not sent to the commercial mobile operator. If however, validation is successful, then the CMAS alert message with the text component and the indications of the locations of the multimedia components are sent to the commercial mobile operator at step 145. Another check for validity is made at step 146, and if not valid, a negative acknowledge is sent to the government at step 147 and the process is ended. If the check passes validity, then using the indications of the locations of the multimedia components, the commercial mobile operator retrieves the multimedia components from the Alerting Gateway in the government alerting network at step 148. If the retrieval from the Alerting Gateway of any multimedia component fails at step 149, an error response is returned to the government alerting network and the text component of the CMAS alert will be sent as described in the Nominal Scenario for Text Based CMAS Alert at step 144. If, however, the retrieval is successful, then the commercial mobile operator performs any required transcoding of the multimedia components into formats compatible with the mobile devices and the commercial mobile operator selected technologies at step 150. If the transcoding of the multimedia components fail for any reason (not shown), an error response is returned to the government alerting network and the text component of the CMAS alert will be sent as described in the Nominal Scenario for Text Based CMAS Alert in FIG. 2a.

The commercial mobile operator validates the received CMAS alert message. If the CMAS alert message fails validation, an error response is returned to the government alerting network and the CMAS alert is not broadcast by the commercial mobile operator. Upon successful validation, the commercial mobile operator sends an acknowledgement to the government alerting network that a valid CMAS alert message with all multimedia components has been received. The commercial mobile operator performs geo-targeting at step 151 to translate the indicated alert area indicated the associated set of cell sites/pager transceivers for the broadcast of the CMAS alert at step 152. If the commercial mobile operator does not support CMAS in the indicated alert area, the CMAS alert is not broadcast by the commercial mobile operator. If the commercial mobile operator does not have any cell site/pager transceiver coverage within the indicated alert area, the CMAS alert is not broadcast by the commercial mobile operator. If the CMAS alert is a Presidential alert, the alert area could be a specific area which is mapped to an associated set of cell sites/pager transceivers or the alert area could be the entire nation. If the entire nation is indicated as the alert area then all cell sites/pager transceivers of the commercial mobile operator which support the CMAS service will be used for the broadcast of the CMAS alert.

Since different technologies may be used to broadcast the text and the multimedia components of the CMAS alert message, there may be a different set of associated cell sites/pager transceivers for the text component and multimedia components of the CMAS alert message. The commercial mobile operator broadcasts the text component of the CMAS alert message with indications of the associated multimedia components to the set of cell sites/pager transceivers for the text component of the CMAS alert which were identified by the geo-targeting processing step. The text component of the CMAS alert message will be broadcast via the commercial mobile operator selected technologies. The broadcast of the text component and the multimedia components of the CMAS alert message may not be on the same commercial mobile operator selected technologies. If the text and multimedia components of the CMAS alert message are being broadcast with the same technology, all components may not be broadcast on the same channels/frequencies. If the text and multimedia components of the CMAS alert message are not being broadcast with the same technology, the coverage areas of all broadcasts may not be identical. The commercial mobile operator begins a broadcast of the multimedia components of the CMAS alert message to the set of cell sites/pager transceivers for the multimedia components of the CMAS alert which were identified by the geo-targeting processing step.

The end user may request the multimedia components of the CMAS alert at any time after the presentation of the text component on the mobile device at step 143. Additionally, the multimedia components of the CMAS alert may be broadcast independently of the text component of the CMAS alert. Therefore, the multimedia components need to be continuously rebroadcast until the CMAS alert is cancelled or expires. The mobile device detects the broadcast of the text component of the CMAS alert message via the commercial mobile operator selected technology and receives the text component of the CMAS alert message. In conjunction with the text component of the CMAS alert message, there will be an indication that one or more multimedia components are also being broadcast. If the received CMAS alert is not a Presidential alert and if the end user opt-out selections for CMAS alerts indicate that this type of CMAS alert is not to be presented, the received CMAS is discarded. The text component of the CMAS alert and an indication of additional multimedia information is presented to the end user including the activation of the special emergency alert audible alarm, the activation of the special emergency alert vibration cadence (if mobile device has vibration capabilities), the display of the CMAS alert message text on the visual display of the mobile device. If the end user has muted the mobile device audio and alarms, the special emergency alert audible alarm will not be activated. If the end user has deselected the vibration capabilities of the mobile device, the special emergency alert vibration cadence will not be activated. The end user acknowledges the CMAS alert by appropriate input on the mobile device user interface (e.g., keypad, touch screen). If the end user does not acknowledge the CMAS alert, the mobile device will periodically activate and deactivate the special emergency alert audible alarm, if the mobile device audio is not muted, and will periodically activate and deactivate the special emergency alert vibration cadence, if mobile device has vibration capabilities and if the vibration cadence is not deselected by the end user. Upon acknowledgement by the end user, the mobile device discontinues the special emergency alert audible alarm and the special vibration cadence. The end user requests the additional multimedia alert information by appropriate input on the mobile device user interface.

It is possible that appropriate mobile device user interface input could be defined such that a single input from the end user could be used to both acknowledge the CMAS alarm and to request the additional multimedia alert information. This single input from the end user should comply with the end user selections on muting of the mobile device audio capabilities and should not automatically un-mute the mobile device. The mobile device detects the broadcast of the multimedia components of the CMAS alert and downloads the multimedia components to the mobile device. If the mobile device is unable to detect the broadcast of the multimedia component of the CMAS alert or is unable to download the multimedia components, an indication will be presented to the end user that the multimedia information is not currently available. The end user could have the ability to retry the request for the additional multimedia alert information via an appropriate input on the mobile device user interface. If the broadcast of the multimedia alert information is detected by the mobile device and if the multimedia information is downloaded to the mobile device, the multimedia components of the CMAS alert are presented to the end user. If the end user has muted the audio on their mobile device, the end user will need to un-mute their device before playing any multimedia component with audio capabilities. There is no automatic un-mute of the mobile device audio upon the download of the multimedia components of the CMAS alert. The end user may request the multimedia components at any point within the broadcast. Therefore, the multimedia components must be broadcast on a repeated basis. Note that if the CMAS alert contains multiple multimedia components, the relevant steps may be repeated for each multimedia component as necessary. The mobile device prompts the end user whether or not to store the CMAS alert message with its associated multimedia components. This prompt to the end user could be presented with the multimedia components or could be presented as the result of the end user discontinuing the display of the multimedia components of the CMAS alert. The end user responds to the query of the mobile device via an appropriate input on the mobile device user interface. In accordance with the end user response in the previous step, the mobile device either discards the CMAS alert message or stores the CMAS alert message including the multimedia components in mobile device memory. If the mobile device memory storage for CMAS alerts is full, the mobile device will discard the oldest entry in the mobile device memory in order to have memory space for this newest CMAS alert message.

Updates to CMAS Alert Messages

The alerting area of the event that caused an alert may have changed because of conditions such as the alerting area is now larger or the event has moved (e.g., a tornado). The indicated alert area in the updated CMAS alert could be one of the following: (a) the updated alert area includes the total previous alert area; (b) the updated alert area includes part but not all of the previous alert area, or (c) the updated alert area includes none of the previous alert area.

Case a is not a problem but cases b and c do raise issues for the user experience. Under cases b and c, if the wireless operator defines the alerting area based only upon the updated CMAS alert message, there could be subscribers who have received the previous CMAS alert message but may not receive the updated CMAS alert area. These conditions can still occur even if the wireless operators are converting the alerting areas to associated counties.

Therefore, to avoid the potential problems of cases b and c, the set of cell sites used for the broadcast of the updated CMAS alert message may include both the cell sites of the previous CMAS alerts and the cell sites identified for the alerting area in the updated CMAS alert message. Thus, for an updated CMAS alert, the geo-targeted geography will preferably be calculated using both the alerting area of the updated CMAS alert and the alerting area of the previous CMAS alert. Likewise, if an update is issued for a CMAS alert which contains audio, video, or multimedia components, that updated CMAS alert message will contain all associated audio, video, or multimedia regardless if those components have any modification to them.

Cancellation of CMAS Alert Messages

In the event that a previously issued CMAS alert is to be cancelled, the process for issuing the alert is followed up to a certain point. Rather than the mobile operator delivering the CMAS alert in accordance with the alert type and process described above, a CMAS alert cancellation message is broadcast by the mobile network operator and if the active CMAS alert had been presented to the end user, the CMAS alert cancellation is presented to the end user including the activation of the special emergency alert tone and/or the activation of the special emergency alert vibration cadence (if mobile device has vibration capabilities) for a short duration as defined by commercial mobile operator policies and the capabilities of the mobile device, and the display of the CMAS alert cancellation message text on the visual display of the mobile device.

Expiration of CMAS Alert Messages

Alert expiration will occur if the expiration time of a previously issued CMAS alert has been reached, in which case any active broadcasts of text component of the previously issue CMAS alert are discontinued or all active broadcasts of any associated audio, video, or multimedia components of the previously issue CMAS alert are discontinued. For the mobile network operator, simply discontinuing the broadcast of the alert messages upon expiration is sufficient.

On the mobile device side, the CMAS alert will expire when the expiration time of a previously issued CMAS alert has been reached. At that point, the mobile device preferably discontinues the special emergency alert tone and/or the special vibration cadence, if these alert notifications have not yet been acknowledged by the end user. Additionally, any periodic re-issuance of the special alert tone and/or special vibration cadence for unacknowledged CMAS alerts will also be discontinued. The presentation of the CMAS alert to the end user will be updated to indicate that the CMAS alert has expired, while the stored CMAS alert (if any) in the mobile device memory is modified to indicate that the CMAS alert has expired. Because the mobile device expiration process is independent of that for the mobile network operator, it is preferably that once the mobile device detects the expiration, that the mobile device then ignore any late retransmissions or late broadcasts of the CMAS alert message that has expired.

Referring again to FIG. 1, upon receipt of the emergency alert message at step 14, the emergency alert gateway 30 processes the received emergency alert message as described with respect to the process depicted in FIG. 2. In an example embodiment, at step 16, the emergency alert gateway 30 accesses a database 28 to determine if the initiator/originator is authorized. The database 28 can comprise any appropriate storage. In an example embodiment the database 28 comprises a list of authorized initiators/originators. At step 18, an indication is provided to the emergency alert gateway 30 as to whether the initiator/originator is authorized. If the initiator/originator is an authorized initiator/originator, a predetermined emergency alert message comprising optional free-form text or characters, is provided to the emergency alert server 32 at step 20. Thus, if the initiator/originator is an authorized initiator/originator and free-form text or characters accompany the emergency alert message provided at step 14, the free-form text or characters are provided as the predetermined emergency alert message at step 20. If the initiator/originator is an authorized initiator/originator, and no free-form text or characters accompany the emergency alert message provided at step 14, the selected or generated default predetermined emergency alert message is provided at step 20. If, at step 18, an indication is provided to the emergency alert gateway 30 that the initiator/originator is not an authorized initiator/originator, the selected or generated (e.g., as described with respect to the process depicted in FIG. 2) predetermined emergency alert message is provided at step 20.

Thus, if it is determined that the initiator/originator of the emergency alert message is not authorized to deviate from the format of the predetermined emergency alert message, the predetermined emergency alert message is provided at step 20. If it is determined that the initiator/originator of the emergency alert message is authorized to deviate from the format of the predetermined emergency alert message, the predetermined emergency alert message, formatted in accordance with the authorized initiator/originator format, is provided at step 20.

The emergency alert server 32, upon receiving a predetermined emergency alert message, determines the appropriate mobile devices 38 to receive the predetermined emergency alert message. At step 22, the emergency alert server 32 provides the predetermined emergency alert message to the appropriate mobile devices 38 via a cellular radio network 34 and transmitters 36.

The mobile devices 38 are representative of any appropriate type of device that can receive emergency alert messages. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Figure 3:
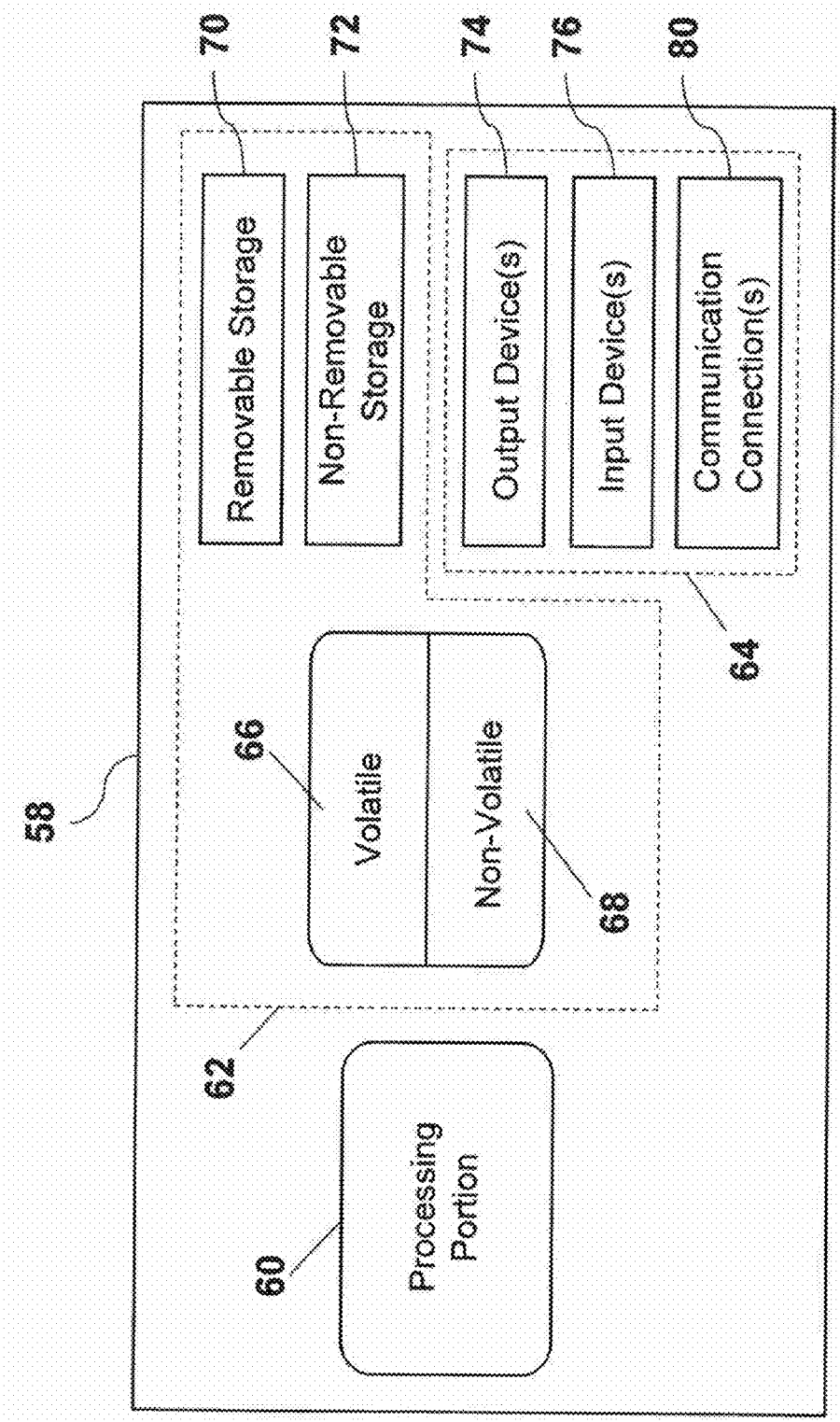
FIG. 3 is a block diagram of an example processor for generating and/or selecting and distributing a predetermined emergency alert message.

FIG. 3 is a block diagram of an example processor 58 for generating and/or selecting and distributing a predetermined emergency alert message. In an example configuration, the processor 58 comprises the emergency alert gateway 30, the emergency alert server 32, the database 28, or a combination thereof. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications therebetween. The input/output portion 64 is capable of providing and/or receiving components utilized to generate/select and distribute a predetermined emergency alert message as described above. For example, as described above, the input/output portion 64 is capable of providing/receiving an emergency alert message from an emergency alert network, a request to a database for determining if an initiator/originator is authorized, an indication as to whether an initiator/originator is authorized, a predetermined emergency alert message with or without free form text or characters, or a combination thereof. The processing portion 60 is capable of parsing and analyzing a received emergency alert message, generating a predetermined emergency alert message, selecting a predetermined emergency alert message, or a combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with generating/selecting and distributing a predetermined emergency alert message. For example, as described above, the memory portion is capable of storing the list of a predetermined emergency alert messages, a list of authorized initiators/originators, or a combination thereof. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 80 that allow the processor 58 to communicate with other devices, for example. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included.

The following description sets forth some exemplary telephony radio networks and non-limiting operating environments in which predetermined emergency alert messages can be implemented. The below-described operating environments should be considered non-exhaustive, however, and thus the below-described network architectures merely show how predetermined emergency alert messages can be incorporated into existing network structures and architectures. It can be appreciated, however, that predetermined emergency alert messages can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS channel assignment can be applied independently of the method for data transport, and do not depend on any particular network architecture, or underlying protocols.

Figure 4:
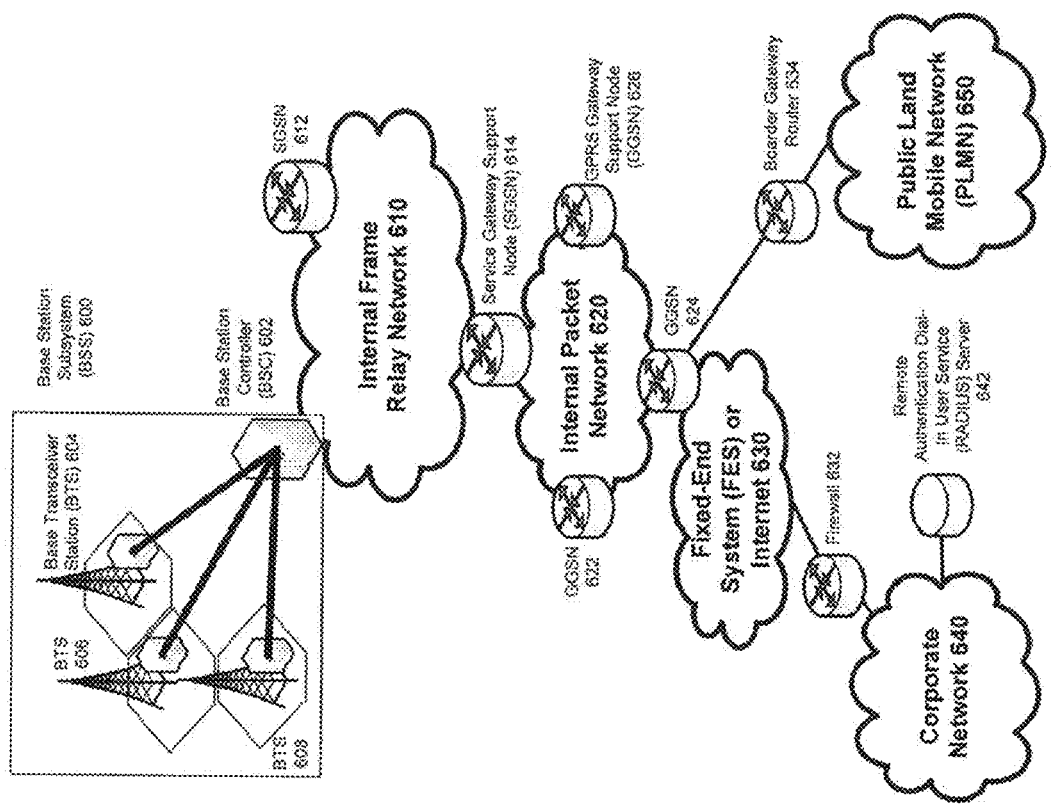
FIG. 4 depicts an overall block diagram of an exemplary packet-based mobile cellular network environment, such as a GPRS network, in which predetermined emergency alert messages can be practiced.

FIG. 4 depicts an overall block diagram of an exemplary packet-based mobile cellular network environment, such as a GPRS network, in which the system for implementing predetermined emergency alert messages can be practiced. In an example configuration, the cellular radio network 34 and towers 36 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
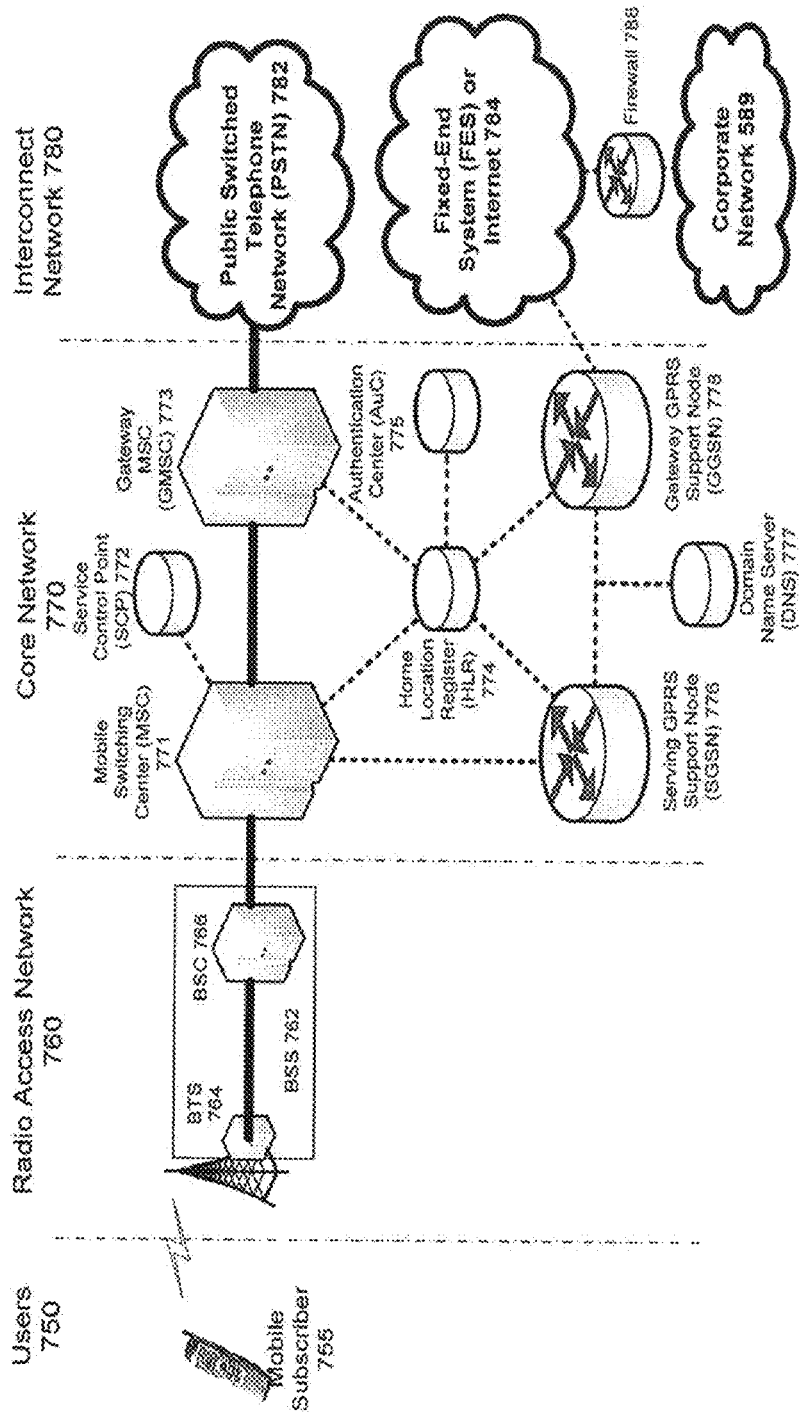
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile device 12. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of predetermined emergency alert messages can include but are not limited to Gateway GPRS Support Node tables, Fixed End System router tables, firewall systems, VPN tunnels, and any number of other network elements as required by the particular digital network.

Figure 6:
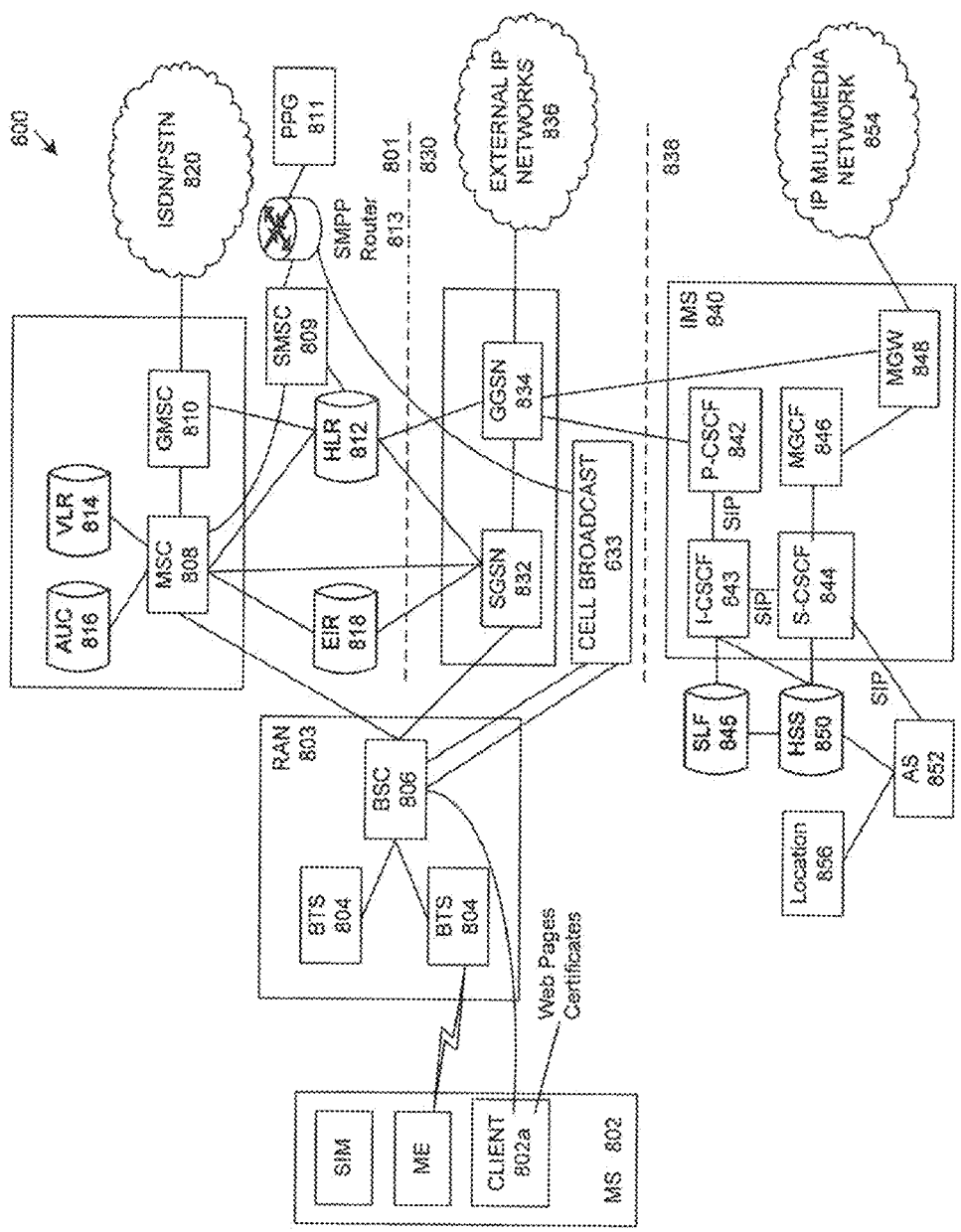
FIG. 6 illustrates an example alternate block diagram of an exemplary GSM/GPRS/IP multimedia network architecture in which predetermined emergency alert messages can be incorporated.

FIG. 6 illustrates another exemplary block diagram view of a GSM/GPRS/IP multimedia network architecture 800 in which predetermined emergency alert messages can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of predetermined emergency alert messages have been described in connection with various computing devices, the underlying concepts can be applied to any computing device or system capable of implementing predetermined emergency alert messages. The various techniques described herein can be implemented in connection with hardware or software or, where appropriate, with a combination of both. Thus, the methods and apparatus for generating, selecting, and/or implementing predetermined emergency alert messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing predetermined emergency alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

While the present invention has been described in connection with the various embodiments of the various figures, it is to be understood that other similar embodiments can be used or modifications and additions can be made to the described embodiment for performing the same function without deviating therefrom. For example, one skilled in the art will recognize that the definitions and scopes of mobile alerts as described in the present application may apply to any environment, whether wired or wireless, and may be applied to any number of such devices connected via a communications network and interacting across the network. Therefore, the method and system of defining mobile alerts should not be limited to any single embodiment, but rather should be construed in breadth and scope in accordance with the appended claims.

What is claimed:

1. A system for distributing emergency alerts comprising:
an emergency alert gateway configured for:
receiving an emergency alert message wherein the emergency alert message includes a text portion and one of an audio portion, a video portion, an audio-video portion, or a multi-media portion;
storing the audio, video, audio-video, or multimedia portion of the emergency alert message to form a first stored portion; and
determining a subscriber base to receive the emergency alert message;
a database in communication with the alert gateway; and validating an availability for the stored portion of the emergency alert message; and an emergency alert server configured to broadcast the emergency alert message to the subscriber base when the first stored portion of the emergency alert message is not available.

2. The method of claim 1 further comprising retrieving the stored portion of the emergency alert message after the validating step and wherein the broadcasting step includes the broadcasting of the stored portion of the emergency alert message.

3. The method of claim 1 further comprising geo-targeting a subscriber base that will receive the broadcast emergency alert message.

4. The method of claim 3 further comprising modifying a geo-targeted area of the geo-targeted subscriber base and broadcasting the emergency alert message to both the geo-targeted subscriber base identified by the geo-targeting step and an updated subscriber base based on the modified geo-targeted area.

5. The method of claim 1 wherein the broadcasting step includes determining a receive capability of a mobile device and broadcasting the emergency alert message according to the receive capability of the mobile device.

6. The method of claim 1 further comprising modifying the emergency alert message and broadcasting the modified emergency alert message, wherein the modified emergency alert message includes previously broadcast audio, video or multimedia files.

7. A system for distributing emergency alerts comprising:
an emergency alert gateway configured for:
receiving an emergency alert message wherein the emergency alert message includes a text portion and one of an audio portion, a video portion, an audio-video portion, or a multi-media portion;
storing the audio, video, audio-video, or multimedia portion of the emergency alert message to form a first stored portion; and
determining a subscriber base to receive the emergency alert message;
a database in communication with the alert gateway; and
validating an availability for the stored portion of the emergency alert message; and
an emergency alert server configured to broadcast the emergency alert message to the subscriber base when the first stored portion of the emergency alert message is not available.

8. The system of claim 7 wherein the emergency alert message is broadcast to a first geo-targeted area.

9. The system of claim 8 wherein the geo-targeted area is updated to a second geo-targeted area and a revised emergency alert message is sent to the first geo-targeted area and to the second geo-targeted area.

10. The system of claim 7 wherein the stored portion of the emergency alert message is updated and the alert server broadcasts both the updated stored portion of the emergency alert message and the first stored portion of the emergency alert message.

11. The system of claim 7, wherein the emergency alert message is modified.

12. The system of claim 11, wherein the modified emergency alert message includes previously broadcast audio, video, or multimedia files.

13. A tangible computer readable storage medium comprising computer executable instructions that when executed by a processor cause said processor to perform the steps of
determining a message is an emergency alert message, the emergency alert message comprising a text portion and at least one of an audio portion, a video portion, an audio-video portion, or a multi-media portion;
storing the at least one of the audio, video, audio-video, or multi-media portion of the emergency alert message to form a stored portion;
validating an availability for the stored portion of the emergency alert message; and
broadcasting, by the system, the text portion of the emergency alert message when the stored portion is unavailable.

14. The computer readable storage medium of claim 13, further comprising instructions for: retrieving the stored portion of the emergency alert message after the validating step and wherein the broadcasting step includes the broadcasting of the stored portion of the emergency alert message.

15. The computer readable storage medium of claim 13, further comprising instructions for: geo-targeting a subscriber base that will receive the broadcast emergency alert message.

16. The computer readable storage medium of claim 13, further comprising instructions for:
modifying a geo-targeted area of the geo-targeted subscriber base and broadcasting the emergency alert message to both the geo-targeted subscriber base identified by the geo-targeting step and an updated subscriber base based on the modified geo-targeted area.

17. The computer readable storage medium of claim 13, wherein the broadcasting step includes determining a receive capability of a mobile device and broadcasting the emergency alert message according to the receive capability of the mobile device.

18. The computer readable storage medium of claim 13, further comprising instructions for:
modifying the emergency alert message.

19. The computer readable storage medium of claim 18, further comprising instructions for:
broadcasting the modified emergency alert message, wherein the modified emergency alert message includes previously broadcast audio, video or multimedia files.

* * * * *